United States Patent Office 3,625,734
Patented Dec. 7, 1971

3,625,734
ULTRA-THIN LIQUID MEMBRANE
CONSTRUCTION
William J. Ward III, Schenectady, N.Y., assignor to
the United States of America
No Drawing. Filed Oct. 16, 1969, Ser. No. 867,088
Int. Cl. B44d 1/14; B23d 27/08
U.S. Cl. 117—46 CA  5 Claims

ABSTRACT OF THE DISCLOSURE

A method for the preparation of a stable immobilized liquid membrane having a thickness of 0.1 mil, or less, is described. The preparation of such a membrane construction comprising polyethylene glycol supported on a porous polymer membrane (rendered non-wetting by the deposition of sub-micron size particles of polytetra-fluoroethylene thereover) is described, the particular membrane having specific application to the separation of sulphur dioxide from gas mixtures.

BACKGROUND OF THE INVENTION

The invention described herein was made in the course of, or under, a contract with the Department of Health, Education and Welfare.

Ever-increasing attention is being focussed on the problem of air pollution and one of the pollutants about which the most concern has been expressed is sulphur dioxide. Sulphur dioxide pollution results in most part from the burning of coal and heavy fuel oil. In many urban areas the extent of sulphur dioxide pollution poses a serious health hazard and the Department of Health, Education and Welfare has predicted that the total sulphur dioxide discharge into the atmosphere will double by the year 1980 unless some improvement is made in the control practices presently employed with respect to stack gases. The search for an economically attractive process for the elimination of $SO_2$ has been extensive, however, to date research on this subject has been largely unsuccessful.

It has been known for many years that thin films or membranes of natural or synthetic polymeric materials, which are hole-free, are still to varying extents permeable to gases, vapors and liquids. The term "gas" or "gases" as used hereinbelow will be intended to include vapors. Those membranes, which exhibit selective permeability toward the ingredients of a gaseous mixture (or mixture of vapors) are useful for effecting separation of the mixture components. Such membranes are referred to as "permselective" membranes. A constant obstacle to the commercial utilization of this phenomenon of diffusion through solid membranes has been the rate at which such diffusion occurs even under the imposition of significant differences in total or partial pressure.

The use of liquid membranes for gas separation has been disclosed in U.S. Patent No. 3,335,545—Robb et al., incorporated herein by reference. It was disclosed in this patent that the conventionally recognized solid polymer barrier well known in the art for the separation of gases through the phenomenon of selective permeation can be replaced by a liquid film resulting in a considerable increase in degree of separation of certain gases.

Immobilization or support of such a liquid film can be effected in a number of ways. Thus, the thin liquid membrane can be supported on a porous, unwet backing having such fine holes that the liquid cannot run through the porous material; the liquid film can be supported on a non-interacting polymer film selected so that the ratio of permeation rate to thickness will be appreciably higher for the polymer than for the liquid film thereby insuring that the liquid film is the controlling permeation factor, or various polymer films can be made to take up large quantities of liquid as described in the Robb et al. patent.

The use of immobilized films of polyethylene glycol liquid for the separation of sulphur dioxide from gas mixtures is described in applicant's U.S. patent application Ser. No. 752,803, filed Aug. 15, 1968, and now U.S. Patent No. 3,503,186. This patent application is assigned to the assignee of the instant application and is incorporated herein by reference in its entirety. A method for the preparation of a porous cellulose film impregnated with tetraethylene glycol dimethyl ether (TEG-DME) is specifically described therein. However, since the amount of gas or liquid that can permeate through either a solid or a liquid membrane of given area in a given time is dependent upon the thickness of the membrane (in addition to other factors, such as the pressured drop across the membrane for the component of interest), the art of gas separation (particularly with respect to $SO_2$ elimination and control) is in need of even thinner membrane constructions made by processes, which do not require handling of the membrane in the unsupported state.

SUMMARY OF THE INVENTION

Progress in the fulfillment of the aforementioned need is provided by the instant invention wherein the surface of a porous substrate is first covered with a micro-porous non-wetting film; the surface of the micro-porous film so deposited is then rendered wetting in nature and finally an immobilized liquid film is deposited over the micro-porous film by solvent casting or dipping. This completed laminate constitutes a very effective, fully supported stabilized permeation barrier in which the liquid film has a thickness of the order of 0.1 mil.

DESCRIPTION OF THE PREFERRED EMBODIMENT

As stated hereinabove, the production of ultra thin immobilized liquid films requires that the film be processed without handling the film in the unsupported state.

For this reason an attempt was made to deposit the film-forming liquid and an immobilizing agent therefor directly on a suitable porous substrate as by casting, dipping or spraying. After this deposition had been accomplished the liquid was immobilized as, for example, by heating.

By this procedure a film of immobilized polyethylene glycol was cast directly upon a porous substrate using the following casting solution:

| | Percent by wt. |
|---|---|
| Poly(N,N-dimethylacrylamide) | 2 |
| Polyethylene glycol (mol wt. 600) | 8 |
| Water | 90 |

The ultra-fine porous polymer membrane disclosed in U.S. patent application S.N. 717,893 of Weininger et al. filed Apr. 1, 1968 and assigned to the assignee of the instant invention, and now abandoned, was employed as the substrate. The casting solution was spread over the porous substrate at room temperature (about 23° C.) and the water was permitted to evaporate from the cast film at room temperature. A high viscosity film (0.1 mil thick) of the polyethylene glycol plus the immobilizing polymer remained on the support member.

Unfortunately, however, over a period of days the liquid of the film entered the pores of the substrate without the application of pressure differential thereto and destroyed the effectiveness of the film. It was concluded that the pores of the substrate would have to be rendered non-wetting to the film liquid in some manner and the process and composite structure of this invention evolved as described below.

The composite membrane construction of this invention is prepared by selecting for the substrate, or backing layer, a porous solid sheet, the pores of which may extend through the substrate from face to face or be in an interconnected network, so long as ready transport of gas is provided through the substrate and the pore size is small relative to the thickness of the immobilized liquid membrane to be supported thereby.

The thickness of the substrate is controlled by the ability thereof to exercise the support function but, in general, substrate thicknesses of at least about 5 mils and pore sizes of about 0.25 micron or less are sufficient.

As will be described in greater detail hereinafter, the porous substrate must be able to remain substantially unaffected by exposure to elevated temperatures. This capability is required, because the surface of the porous substrate is to receive a suspension of polytetrafluoroethylene particles, and the suspension contains a dispersing agent to promote the dispersion of the polytetrafluoroethylene particles. Heat is required to effect the chemical decomposition of this dispersing agent. The dispersing agent, octylphenyl hydrophobe (iso-octylphenoxy polyethylene oxide), employed in the demonstration of this invention required heating to about 200° C. for decomposition to occupy thereby placing a severe restriction on the selection of the substrate material. However, other surfactants used as dispersion agents for the polytetrafluoroethylene particles having lower decomposition temperatures could be used.

The filter material sold under the trademark "Solvinert" was used, since it was commercially available and met all the criteria of pore size, chemical inertness with respect to materials to be applied thereto, availability in a desirable thickness and ability to stand heating to 200° C. This material appears under infrared analysis to be a mixture of polyvinyl alcohol, polyvinyl chloride, and polyvinyl acetate.

Other materials useful as porous substrates at lower process temperatures include the ultra-fine porous polymer membrane disclosed in the aforementioned Weininger et al application and the materials described in U.S. Patents 3,378,507—Sargent et al.; 2,984,869—Honey et al.; 3,351,489—Larson et al., 3,216,882—Feldt et al. and 3,062,760—Dermody et al. The disclosures of the aforementioned patent application and patents are incorporated herein by reference in their entirety.

An additional criterion for backing materials for those membranes to be employed in the removal of $SO_2$ from combustion gases is the capability for retaining dimensional stability and structural integrity at operating temperatures in excess of 100° C. for periods of at least about one year.

As has been described in the aforementioned U.S. patent application Ser. No. 752,803, TEG-DME (a dimethoxy polyethylene glycol) is the optimum liquid membrane material found to date for the separation of sulphur dioxide from gas mixtures. The preparation of an immobilized liquid film employing this material is described by way of example.

A porous inert backing membrane of Solvinert about 5 mils in thickness having 0.25 micron pores was employed to support the immobilized liquid TEG-DME membrane. First, a colloidal dispersion of polytetrafluoroethylene (¼ micron-size particles) dispersed in water containing a nonionic wetting agent (octylphenyl hydrophobe) was sprayed over a major surface of the membrane backing, while the membrane was heated to a temperature of about 150° C. The most convenient way to accomplish this deposition proved to be to attach the membrane to the surface of a hot plate and to deposit the collodial suspension over the membrane by means of an air brush. Continuous passes of the spray over the membrane surface were made until a layer of polytetrafluoroethylene particles approximately one mil thick had been built up. The application rate of the colloidal dispersion to the heated membrane was adjusted such that after the spray had passed over a given area, a small amount of the sprayed area would remain wet for a few seconds thereafter. After the spraying was completed, the composite (polytetrafluoroethylene-coated backing membrane) was heated to decompose and drive off the wetting agent. Heating in air at about 200° C. for a period not in excess of one hour was sufficient to achieve this purpose.

In order to deposit an immobilized liquid film of polyethylene glycol directly over the micro-porous polytetrafluoroethylene film, the outer surface of this latter film had to be made wetting to the solvent for the immobilized liquid film system (liquid film plus immobilizing agent). The solvent, which should constitute at least about 80% (by weight) of the solution containing the film system, must later evaporate from the solution cast over the laminated substrate and deposit the very thin immobilized film uniformly over the non-wetting microporous layer. In the case of the polyethylene glycol film this was accomplished by spraying the surface of the micro-porous film with a dilute aqueous solution of polyethylene glycol and hydroxymethyl cellulose (immobilizing agent) at a temperature of about 100° C. The spraying solution consisted of:

|  | Percent by weight |
|---|---|
| Hydroxymethyl cellulose | 0.02 |
| Polyethylene glycol (molecular weight of 600) | 0.6 |
| Water | 99.4 |

A loading of approximately 50 mg./cm.$^2$ of spraying solution was sufficient to render the polytetrafluoroethylene surface wetting to the solvent (water) even though the surface had not been covered with a continuous liquid film at this point. To form a continuous film of polyethylene glycol solution the composite with the polytetrafluoroethylene surface (now rendered wetting) was dipped into, and then withdrawn from, a dilute aqueous solution of polyethylene glycol and hydroxymethyl cellulose. After withdrawal, the water was permitted to evaporate at room temperature (about 23° C.). A suitable dipping solution consisted of:

|  | Percent by weight |
|---|---|
| Hydroxymethyl cellulose | 0.4 |
| Polyethylene glycol (molecular weight of 600) | 7.0 |
| Water | 92.6 |
| Octylphenyl hydrophobe | 0.04 |

It has been found that polyethylene glycol having a molecular weight of 4000 can be substituted for the 600 molecular weight mateiral. In fact it has been established that the permeation properties of polyethylene glycols above their melting points are essentially independent of molecular weight.

In either case, with a withdrawal rate of approximately 5 cm./min. from the dipping solution (at about 23° C.), the resulting (after evaporation of the very large water content) continuous immobilized polyethylene glycol film covering the polytetrafluoroethylene layer had a thickness of the order of 0.1 mil. Upon testing, this film was found to be free of pinholes and had a sufficiently high $SO_2$ throughput and selectively as to be acceptable for use in a membrane system for removing $SO_2$ from stack gases.

Still another dipping solution had the following composition:

|  | Percent by weight |
|---|---|
| Hydroxymethyl cellulose | 0.45 |
| Polyethylene glycol (molecular weight 4000) | 9.1 |
| Octylphenyl hydrophobe | 0.04 |
| Water | 90.4 |

With a withdrawal rate of approximately 5 cm./min. from the dipping solution, the resulting immobilized film of polyethylene glycol was also continuous and of the order of 0.1 mil in thickness. Both films described hereinabove had the following approximate permeation properties of 100° C.:

$$\text{Gas Flux} \left( \frac{\text{cc. (STP)}}{\text{sec., cm.}^2, \text{Hg}\Delta P} \right) \times 10^3$$

$SO_2$ ---------------------------------------- 3.2
$CO_2$ ---------------------------------------- 0.178
$N_2$ ----------------------------------------- 0.0127

This is a sufficiently high $SO_2$ throughput and selectivity as to be acceptable for use in a membrane system for removing $SO_2$ from stack gases containing in the order of 10 percent $SO_2$.

Information Bulletin No. X–50f released by the Plastics Department of E. I. du Pont de Nemours & Co. (Inc.), Wilmington, Del., is incorporated herein for its teachings with respect to TFE-fluorocarbon resin dispersions and processing techniques, particularly the discussion therein with respect to stabilizing or dispersing agents for the Teflon particles.

In the laminated structure for selective gas permeation produced by this method each lamina should contribute to, rather than detract from, the overall purpose to be accomplished. Thus, in practicing this invention employing a given immobilized liquid film material selected for a particular task of gas separation, neither the micro-porous non-wetting layer nor the material applied thereto (for rendering the outer face thereof wetting with respect to the solvent for the after-applied immobilized liquid film system) should have permeability characteristics with respect to the particular gas to be separated, which are less beneficial than the permeability characteristics of the immobilized liquid film itself. In addition, with respect to the material used to render the surface of the micro-porous layer wetting, the material selected should have a vapor pressure of substantially zero in order to reduce as much as possible the occurrence of changes in the permeability characteristics of the laminate. For this reason, it is preferable to use a dilute solution of the immobilized liquid film system to render wetting to the film solvent the outer face of the micro-porous layer.

What I claim as new and desire to secure by Letters Patent of the United States is:

1. A process for the preparation of an immobilized liquid membrane comprising in combination the steps of:
   (a) coating a major surface of a porous backing sheet with a layer of colloidal tetrafluoroethylene resin particles suspended in water containing a thermally decomposable dispersing agent,
   (b) heating the coated backing sheet to a temperature in excess of the decomposition temperature of said dispersing agent for a period of time sufficient to effect complete decomposition thereof, to remove the water and to deposit a micro-porous non-wetting layer of said resin over said major surface,
   (c) depositing a liquid film material in solution with an immobilizing agent therefor over said non-wetting resin layer, the deposition being accomplished in two stages:
      (1) dispersing, and simultaneously removing solvent from, an amount of said solution over the outer face of said non-wetting resin layer sufficient to render said outer face wetting to the solvent for said soltuion,
      (2) solvent casting a continuous film of said solution over said outer face so treated and
   (d) evaporating said solvent whereby a continuous immobilized liquid film is deposited over said micro-porous layer.

2. The process recited in claim 1 wherein the solvent constitutes at least about 80% (by weight) of the solvent casting solution.

3. The process recited in claim 1 wherein the solution applied in step (c)–(1) is very dilute as compared to the solution used in the solvent casting of step (c)–(2).

4. The process recited in claim 1 wherein the solution contains a polyethylene glycol.

5. The process recited in claim 1 wherein the porous backing sheet is a mixture of polyvinyl alcohol, polyvinyl chloride and polyvinyl acetate and the dispersing agent is octylphenyl hydrophobe.

References Cited
UNITED STATES PATENTS

| | | | |
|---|---|---|---|
| 3,335,545 | 8/1967 | Robb et al. | 55—158 |
| 3,396,510 | 8/1968 | Ward et al. | 55—16 |
| 3,503,186 | 3/1970 | Ward | 55—16 |
| 3,378,507 | 4/1968 | Sargent et al. | 55—16 UX |
| 2,984,869 | 8/1961 | Honey et al. | 55—16 UX |
| 3,351,489 | 11/1967 | Larson et al. | 55—16 UX |
| 3,216,882 | 10/1965 | Feldt et al. | 55—16 UX |
| 3,062,760 | 11/1962 | Demody et al. | 55—16 UX |
| 3,311,494 | 3/1967 | Reinert et al. | 117—161 UF |
| 3,360,396 | 12/1967 | Kennedy et al. | 117—161 UF |
| 3,379,552 | 4/1968 | Kurtz | 117—161 UF |

WILLIAM D. MARTIN, Primary Examiner

M. SOFOCLEOUS, Assistant Examiner

U.S. Cl. X.R.

117—76 F, 138.8 V, PV, 161 UF; 55—16, 158